United States Patent
Liao et al.

(10) Patent No.: US 11,968,980 B2
(45) Date of Patent: Apr. 30, 2024

(54) ANTIBACTERIAL AND ANTIFUNGAL POLYESTER MATERIAL

(71) Applicant: NAN YA PLASTICS CORPORATION, Taipei (TW)

(72) Inventors: Te-Chao Liao, Taipei (TW); Chun-Che Tsao, Taipei (TW); Yueh-Shin Liu, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 11 days.

(21) Appl. No.: 17/671,594

(22) Filed: Feb. 15, 2022

(65) Prior Publication Data

US 2023/0000084 A1    Jan. 5, 2023

(30) Foreign Application Priority Data

Jun. 30, 2021 (TW) ................... 110123923

(51) Int. Cl.
| | |
|---|---|
| *A01N 59/16* | (2006.01) |
| *A01N 25/10* | (2006.01) |
| *A01N 25/26* | (2006.01) |
| *A01P 1/00* | (2006.01) |
| *A01P 3/00* | (2006.01) |

(52) U.S. Cl.
CPC ............ *A01N 59/16* (2013.01); *A01N 25/10* (2013.01); *A01N 25/26* (2013.01); *A01P 1/00* (2021.08); *A01P 3/00* (2021.08)

(58) Field of Classification Search
CPC ............ D01F 6/62; A01N 59/16; A01N 25/12
See application file for complete search history.

(56) References Cited

U.S. PATENT DOCUMENTS

| | | | |
|---|---|---|---|
| 11,102,979 B2 * | 8/2021 | Jiang | ............ A01N 25/34 |
| 2010/0247889 A1 | 9/2010 | Kliesch et al. | |
| 2011/0097370 A1 | 4/2011 | Wang et al. | |
| 2012/0321689 A1 | 12/2012 | Kobayashi | |
| 2014/0322512 A1 * | 10/2014 | Pham | ................ D01F 8/16 428/220 |
| 2021/0047756 A1 * | 2/2021 | Ammen | ................ D01F 6/62 |

FOREIGN PATENT DOCUMENTS

| | | | | |
|---|---|---|---|---|
| CN | 102040828 A | | 5/2011 | |
| CN | 102933654 A | | 2/2013 | |
| CN | 103709669 A | | 4/2014 | |
| CN | 111154236 A | | 5/2020 | |
| CN | 112679915 A | | 4/2021 | |
| DE | 102007043311 B4 | * | 2/2010 | ............ A01N 25/10 |
| JP | 2011502828 A | | 1/2011 | |
| TW | I555638 B | | 11/2016 | |
| WO | WO2010098309 A1 | | 9/2010 | |
| WO | WO2010143317 A1 | | 12/2010 | |
| WO | WO2018056294 A1 | | 3/2018 | |

OTHER PUBLICATIONS

Haas et al., Biomaterials Applications, 2015, 30(4), 450-462.*
Keese et al. ACS Omega, 2019, 4, 5768-5775.*

* cited by examiner

*Primary Examiner* — Kyle A Purdy

(74) *Attorney, Agent, or Firm* — Li & Cai Intellectual Property Office

(57) ABSTRACT

An antibacterial and antifungal polyester material is provided, which includes a polyester resin substrate material and a plurality of functional polyester master-batches. The functional polyester master-batches are dispersed in the polyester resin substrate material. Each of the functional polyester master-batches includes a polyester resin matrix material and an antibacterial and antifungal additive. The antibacterial and antifungal additive includes a plurality of glass beads. The glass beads are dispersed in the polyester resin matrix material, and a plurality of silver nanoparticles are distributed on an outer surface of each of the glass beads.

10 Claims, 3 Drawing Sheets

ANTIBACTERIAL AND ANTIFUNGAL POLYESTER MATERIAL

CROSS-REFERENCE TO RELATED PATENT APPLICATION

This application claims the benefit of priority to Taiwan Patent Application No. 110123923, filed on Jun. 30, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a polyester material, and more particularly to an antibacterial and antifungal polyester material.

BACKGROUND OF THE DISCLOSURE

Based on hygiene considerations, surfaces of certain materials (such as a food packaging material and medical and sanitary equipment) usually need to have antibacterial and antifungal properties. In order to enable the surfaces of these materials to have the antibacterial and antifungal properties, a coating method or a spray method is usually adopted in the related art. Although using the methods mentioned can enable these materials to maintain good transparency, the antibacterial and antifungal properties on the surfaces of these materials cannot be maintained for a desired time. Furthermore, the surfaces of these materials are antibacterial and antifungal only against limited types of bacteria.

In addition, in the related art, an internal addition method is also adopted to enable the surfaces of these materials to have the antibacterial and antifungal properties. However, master-batches used in the internal addition method will greatly affect the transparency and haze of the material. For example, the transparency of the material is greatly reduced, and the haze of the material is greatly increased.

SUMMARY OF THE DISCLOSURE

In response to the above-referenced technical inadequacies, the present disclosure provides an antibacterial and antifungal polyester material.

In one aspect, the present disclosure provides an antibacterial and antifungal polyester material, which includes a polyester resin substrate material and a plurality of functional polyester master-batches. The plurality of functional polyester master-batches are dispersed in the polyester resin substrate material by means of melt extrusion molding. Each of the functional polyester master-batches includes a polyester resin matrix material and an antibacterial and antifungal additive. The antibacterial and antifungal additive includes a plurality of glass beads, the plurality of glass beads are dispersed in the polyester resin matrix material, and a plurality of silver nanoparticles are distributed on an outer surface of each of the glass beads, so that the polyester material has antibacterial and antifungal properties.

Preferably, based on a total weight of the antibacterial and antifungal polyester material being 100 wt. %, a content range of the polyester resin substrate material is between 80 wt. % and 98 wt. %, and a content range of the plurality of functional polyester master-batches is between 2 wt. % and 20 wt. %. In each of the functional polyester master-batches, a weight ratio range of the polyester resin matrix material relative to the antibacterial and antifungal additive is 70 to 99:1 to 30.

Preferably, in each of the glass beads, the plurality of silver nanoparticles are distributed on the outer surface of each of the glass beads by means of physical adsorption.

Preferably, the antibacterial and antifungal polyester material is capable of being formed into a stretched polyester material through an injection molding process, an extrusion molding process, a vacuum molding process, or a blister molding process.

Preferably, at least parts of the plurality of glass beads in the polyester material are distributed on a surface layer of the polyester material, so as to expose at least parts of the plurality of silver nanoparticles to an external environment and to enable the polyester material to have the antibacterial and antifungal properties.

Preferably, the polyester resin substrate material is polyethylene terephthalate, and in each of the functional polyester master-batches, the polyester resin matrix material is polyethylene terephthalate. The polyester resin substrate material has a first refractive index, the polyester resin matrix material has a second refractive index, and each of the glass beads has a third refractive index. The first refractive index is between 1.55 and 1.60, the second refractive index is between 95% and 105% of the first refractive index, and the third refractive index is between 95% and 105% of the first refractive index.

Preferably, the antibacterial and antifungal polyester material has a visible light transmittance of not less than 80% and a haze of not greater than 5%.

Preferably, the polyester resin matrix material in each of the functional polyester master-batches is polyethylene terephthalate with low crystallinity, and a crystallinity of the polyester resin matrix material is between 5% and 15%.

Preferably, a matrix material of each of the glass beads is soluble glass powders, a particle size of each of the glass beads is not greater than 10 micrometers, a density of each of the glass beads is between 2 $g/cm^3$ and 3 $g/cm^3$, and a heat-resistant temperature of each of the glass beads is not less than 500° C.

Preferably, the antibacterial and antifungal polyester material further includes: an antioxidant and a slip agent dispersed in the polyester resin substrate material. Based on a total weight of the antibacterial and antifungal polyester material being 100 wt. %, a content range of the antioxidant is between 0.1 wt. % and 1.0 wt. %, and a content range of the slip agent is between 0.1 wt. % and 1.0 wt. %.

Preferably, the antibacterial and antifungal additive has an antibacterial property against the following types of bacteria, which include: *Escherichia coli, Staphylococcus aureus, Pneumoniae bacillus, Salmonella, Pseudomonas aeruginosa*, and methicillin-resistant *Staphylococcus aureus*. The antibacterial and antifungal additive has an antifungal property against the following types of fungi, which include: *Aspergillus niger, Penicillium tetrapine, Chaetomium globosum, Gliocladium virens*, and *Aureobasidium pullulans*.

In another aspect, the present disclosure provides an antibacterial and antifungal polyester material, which includes a polyester resin substrate material and an antibacterial and antifungal additive. The antibacterial and antifungal additive includes a plurality of glass beads, the plurality of glass beads are dispersed in the polyester resin substrate material, and a plurality of silver nanoparticles are distributed on an outer surface of each of the glass beads, so that the polyester material has antibacterial and antifungal properties.

Therefore, in the antibacterial and antifungal polyester material provided by the present disclosure, by virtue of introducing the antibacterial and antifungal additive into the polyester material and the antibacterial and antifungal additive including a plurality of glass beads, the plurality of glass beads being dispersed in the polyester material, and a plurality of silver nanoparticles being distributed on an outer surface of each of the glass beads, the polyester material can have good antibacterial and antifungal properties, and can maintain high transparency and low haze at the same time. The antibacterial and antifungal polyester material can still maintain a certain antibacterial and antifungal effect after being used for a period of time. Furthermore, the antibacterial and antifungal polyester material provides promising prospects in application. For example, the antibacterial and antifungal polyester material can be applied to food packaging materials or medical and sanitary equipment with antibacterial and antifungal requirements.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
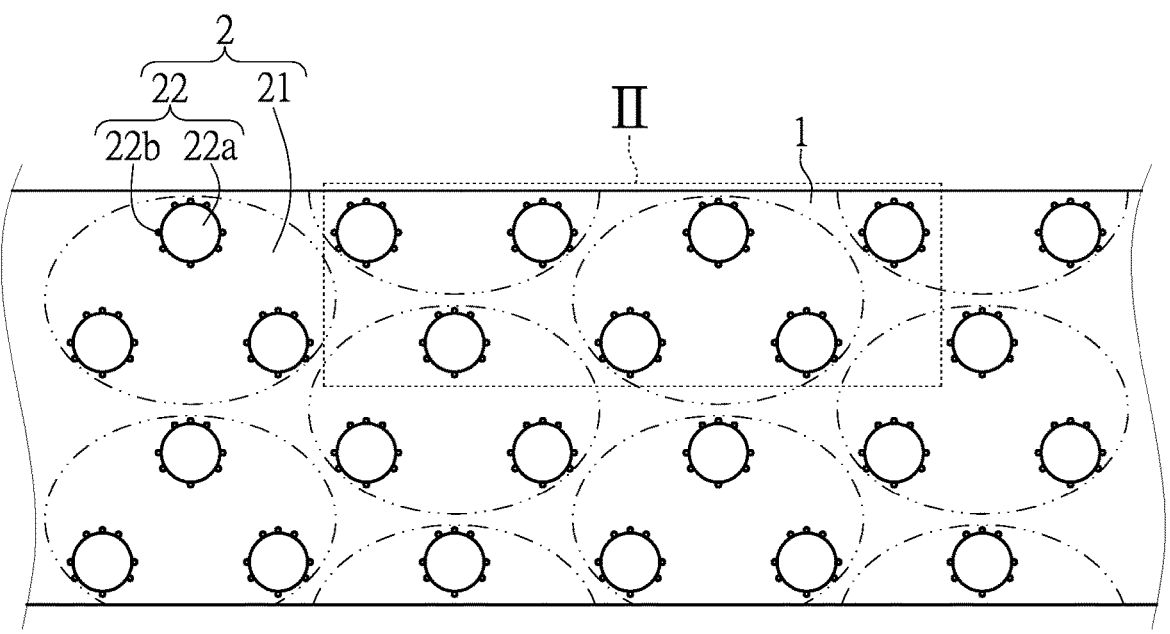
FIG. 1 is a schematic view of an antibacterial and antifungal polyester material according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
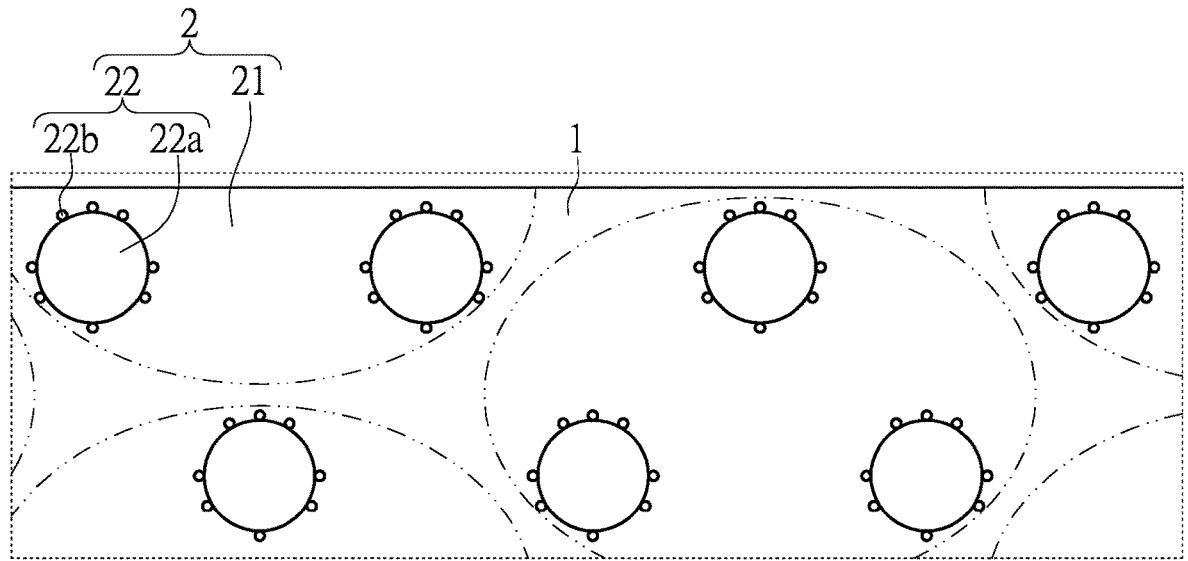
FIG. 2 is a partially enlarged view of area II of FIG. 1.
Figure 3:
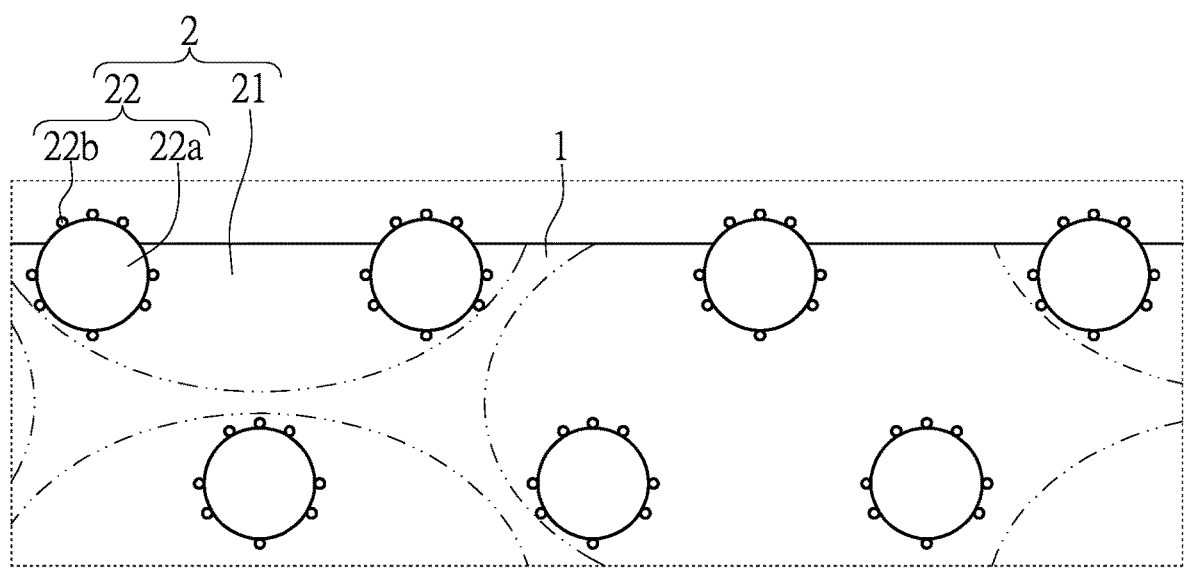
FIG. 3 is a schematic view showing glass beads and silver nanoparticles being exposed outside a material surface.

Referring to FIG. 1 to FIG. 3, a first embodiment of the present disclosure provides an antibacterial and antifungal polyester material 100. The antibacterial and antifungal polyester material 100 has good antibacterial and antifungal properties, and can maintain high transparency and low haze at the same time. The antibacterial and antifungal polyester material 100 can still maintain a certain antibacterial and antifungal effect after being used for a period of time. The antibacterial and antifungal polyester material 100 is antibacterial and antifungal against more types of bacteria and fungi. Furthermore, the antibacterial and antifungal polyester material 100 provides promising prospects in application. For example, the antibacterial and antifungal polyester material 100 can be applied to food packaging materials or medical and sanitary equipment with antibacterial and antifungal requirements.

To achieve the above purposes, the antibacterial and antifungal polyester material 100 of the present embodiment includes a polyester resin substrate material 1 and a plurality of functional polyester master-batches 2. The plurality of functional polyester master-batches 2 are dispersed into the polyester resin substrate material 1 by means of melt extrusion molding. The antibacterial and antifungal polyester material 100 of the present embodiment can have the antibacterial and antifungal properties by introducing the functional polyester master-batches 2.

More specifically, each of the functional polyester master-batches 2 includes: a polyester resin matrix material 21 and an antibacterial and antifungal additive 22. The antibacterial and antifungal additive 22 includes a plurality of glass beads 22a, the plurality of glass beads 22a are dispersed in the polyester resin matrix material 21, and a plurality of silver nanoparticles 22b are distributed on an outer surface of each of the glass beads 22a. Therefore, the antibacterial and antifungal polyester material 100 of the present embodiment can have the antibacterial and antifungal properties through the introduction of the functional polyester master-batches 2.

In more detail, since the plurality of silver nanoparticles 22b are uniformly dispersed on the outer surface of each of the glass beads 22a, the plurality of silver nanoparticles 22b will not agglomerate with each other. Further, the plurality of silver nanoparticles 22b can be dispersed on the outer surface of each of the glass beads 22a in a nanoscale size, thereby providing the antibacterial and antifungal properties.

It is worth mentioning that the glass beads 22a and the plurality of silver nanoparticles 22b distributed on the outer surface thereof are dispersed in the polyester resin substrate material 1 through the functional polyester master-batches 2.

Therefore, the antibacterial and antifungal polyester material 100 includes the plurality of silver nanoparticles 22 dispersed in the nanoscale size, so that the antibacterial and antifungal polyester material 100 has the antibacterial and antifungal properties.

In terms of content range, based on a total weight of the antibacterial and antifungal polyester material being 100 wt. %, a content range of the polyester resin substrate material 1 is preferably between 80 wt. % and 98 wt. %, and is more preferably between 90 wt. % and 98 wt. %. Furthermore, a content range of the plurality of functional polyester master-batches 2 is preferably between 2 wt. % and 20 wt. %, and is more preferably between 2 wt. % and 10 wt. %.

Furthermore, in each of the functional polyester master-batches 2, a weight ratio range of the polyester resin matrix material 21 relative to the antibacterial and antifungal additive 22 (including the glass beads 22a and the silver nanoparticles 22b) is preferably 70 to 99:1 to 30, and is more preferably 85 to 95:5 to 15. As a whole, a content range of the plurality of silver nanoparticles 22b in the antibacterial and antifungal polyester material 100 is preferably between 0.1 wt. % and 5.0 wt. %, and is more preferably between 0.2 wt. % and 2.0 wt. %.

According to the above configuration, the antibacterial and antifungal additive 22 in the functional polyester master-batches 2 can provide sufficient antibacterial and antifungal effects in the polyester material. If the content range of the antibacterial and antifungal additive 22 is lower than a lower limit of the above content range, the concentration of the silver nanoparticles 22b may be insufficient, thereby failing to provide sufficient antibacterial and antifungal effects. Conversely, if the content range of the antibacterial and antifungal additive 22 is higher than an upper limit of the above content range, the concentration of the glass beads 22a may be too high to be uniformly dispersed in the polyester resin substrate material 1. The glass beads 22a in an excessive amount may affect permeability, haze, and a molding effect of the polyester material.

In an embodiment of the present disclosure, in each of the glass beads 22a, the plurality of silver nanoparticles 22b are distributed on the outer surface of the glass bead 22a through physical adsorption, but the present disclosure is not limited thereto.

It is worth mentioning that, since the silver nanoparticles 22b use the glass bead 22a as a carrier thereof and are dispersed on the outer surface of the glass bead 22a in the nanoscale size, the silver nanoparticles 22b are not prone to agglomeration. In addition, when the functional polyester master-batches 2 are dispersed in the polyester resin substrate material 1 by means of melt extrusion molding, the glass bead 22a may break. However, most of the silver nanoparticles 22b are still dispersed and adsorbed on the outer surface of the glass bead 22a in the nanoscale size and will not agglomerate, so that the silver nanoparticles 22b can still provide sufficient antibacterial and antifungal properties.

In an embodiment of the present disclosure, in the antibacterial and antifungal polyester material 100, at least part of the plurality of glass beads 22a are distributed on a surface layer of the antibacterial and antifungal polyester material 100, so that at least part of the plurality of silver nanoparticles 22b are exposed to an external environment to enable the antibacterial and antifungal polyester material 100 to have the antibacterial and antifungal properties.

In an embodiment of the present disclosure, the antibacterial and antifungal polyester material 100 can be stretched to form a stretched polyester material. For example, the antibacterial and antifungal polyester material 100 can be formed into a stretched polyester material through an injection molding process, a vacuum forming process, an extrusion molding process, or a blister molding process. The stretched polyester material can be used, for example, in food packaging materials or medical and sanitary equipment with antibacterial and antifungal requirements.

It is worth mentioning that, after the antibacterial and antifungal polyester material 100 is stretched, the glass beads 22a distributed on the surface layer of the polyester material 100 can protrude more from the polyester material 100 (as shown in FIG. 3). Accordingly, a quantity of the silver nanoparticles 22b exposed to the external environment can be increased, so that the antibacterial and antifungal properties of the polyester material 100 can be more significant.

In terms of material selection, the polyester resin substrate material 1 is the matrix material of the antibacterial and antifungal polyester material 100, and the polyester resin substrate material 1 is obtained by a condensation polymerization reaction of a dibasic acid and a diol or a derivative thereof. Furthermore, the polyester resin matrix material 21 of the functional polyester master-batches 2 is also obtained by a condensation polymerization reaction of a dibasic acid and a diol or a derivative thereof.

The above-mentioned dibasic acid used for forming the polyester material is at least one of terephthalic acid, isophthalic acid, 1,5-naphthalenedicarboxylic acid, 2,6-naphthalenedicarboxylic acid, 1,4-naphthalenedicarboxylic acid, bibenzoic acid, diphenylethane dicarboxylic acid, diphenyl dicarboxylic acid, anthracene-2,6-dicarboxylic acid, 1,3-cyclopentane dicarboxylic acid, 1,3-cyclohexane dicarboxylic acid, 1,4-cyclohexane dicarboxylic acid, malonic acid, dimethylmalonic acid, succinic acid, diethyl 3,3-succinate, glutaric acid, 2,2-dimethylglutaric acid, adipic acid, 2-methyl adipic acid, trimethyladipic acid, pimelic acid, azelaic acid, sebacic acid, suberic acid, and dodecanedioic acid. Furthermore, the above-mentioned diol used for forming the polyester material is at least one of ethylene glycol, propylene glycol, hexamethylene glycol, neopentyl glycol, 1,2-cyclohexanedimethanol, 1,4-cyclohexanedimethanol, 1,10-decanediol, 1,3-propanediol, 1,4-butanediol, 1,5-pentanediol, 1,6-hexanediol, 2,2-bis(4-hydroxyphenyl)propane, and bis(4-hydroxybenzene)stubble.

In an embodiment of the present disclosure, the dibasic acid is terephthalic acid, and the diol is ethylene glycol. Accordingly, the polyester material is polyethylene terephthalate (PET). That is, the polyester resin substrate material 1 is preferably polyethylene terephthalate (PET), and the polyester resin matrix material 21 in the functional polyester master-batch 2 is also preferably polyethylene terephthalate (PET), but the present disclosure is not limited thereto.

It is worth mentioning that, as shown in FIG. 1, the material of the polyester resin substrate material 1 is substantially the same as that of the polyester resin matrix material 21, so that the polyester resin substrate material 1 and the polyester resin matrix material 21 have good compatibility and have no clear boundary.

In an embodiment of the present disclosure, to enable the antibacterial and antifungal polyester material 100 to maintain high transparency and low haze, refractive indexes of different materials have a matching relationship with each other.

For example, the polyester resin substrate material 1 has a first refractive index, the polyester resin matrix material 21 has a second refractive index, and each of the glass beads 22a has a third refractive index. The first refractive index is preferably between 1.55 and 1.60, and is more preferably between 1.57 and 1.59. Furthermore, the second refractive index is preferably between 95% and 105% of the first refractive index, and the third refractive index is preferably between 95% and 105% of the first refractive index.

According to the above-mentioned matching relationship of the refractive indexes of the different materials, the antibacterial and antifungal polyester material 100 can have high transparency and low haze.

For example, the antibacterial and antifungal polyester material 100 preferably has a visible light transmittance of not less than 80%, and more preferably not less than 90%. The antibacterial and antifungal polyester material 100 preferably has a haze of not greater than 5%, and more preferably not greater than 3%.

In an embodiment of the present disclosure, the polyester resin matrix material 21 in each of the functional polyester master-batches 2 is the polyethylene terephthalate (PET) with low crystallinity, and a crystallinity of the polyester resin matrix material 21 is between 5% and 15%.

It is worth mentioning that, in the related art, an antibacterial and antifungal treatment is performed on a surface of a material by a coating method or a spray method. In this way, the material can have excellent transparency. However, such products have poor durability and are antibacterial against limited types of bacteria. Furthermore, most of master-batch carriers in an internal addition method are polypropylene (PP) and polybutylene terephthalate (PBT). A PP carrier has poor compatibility with polyester materials (PET), and a PBT carrier can cause the polyester materials (PET) to have crystallinity, thereby resulting in poor transparency and poor extensibility of a product.

Compared with the related art, the antibacterial and antifungal polyester material 100 of the present embodiment uses polyethylene terephthalate (PET) with low crystallinity as the master-batch carrier. The functional polyester master-batches 2 can be processed by a twin-screw extruder, so as to disperse the glass beads 22a adsorbed with the silver nanoparticles 22b and to introduce a PET polyester material (e.g., the polyester resin substrate material 1) during a material processing operation. Therefore, the antibacterial and antifungal polyester material 100 maintains excellent antibacterial and antifungal capabilities, visible light transmittance, and extensibility at the same time.

It is worth mentioning that, after being stretched, the antibacterial and antifungal polyester material 100 of the embodiment of the present disclosure can still maintain good antibacterial and antifungal capabilities and visible light transmittance. Therefore, the antibacterial and antifungal polyester material 100 of the embodiment of the present disclosure can be applied to food packaging materials or medical and sanitary equipment with antibacterial and antifungal requirements.

In an embodiment of the present disclosure, specifications of the glass bead 22a are within a preferred range. For example, a matrix material of the glass bead 22a can be soluble glass powders; a particle size of the glass bead 22a is not greater than 10 micrometers (preferably between 3 micrometers and 10 micrometers); a density of the glass bead 22a is between 2 $g/cm^3$ and 3 $g/cm^3$ (preferably between 2.3 $g/cm^3$ and 2.8 $g/cm^3$); and a heat-resistant temperature of the glass bead is not less than 500° C.

According to the above configuration, the glass beads 22a can adsorb a sufficient amount of the silver nanoparticles 22b and be dispersed into the polyester resin matrix material 21. The glass beads 22a can withstand a high temperature and a high pressure of a twin-screw extrusion process whilst still adsorbing the sufficient amount of the silver nanoparticles 22b, so that the antibacterial and antifungal polyester material 100 has the antibacterial and antifungal properties.

In terms of additives, the antibacterial and antifungal polyester material 100 further includes: an antioxidant and a slip agent dispersed in the polyester resin substrate material 1. Based on the total weight of the antibacterial and antifungal polyester material being 100 wt. %, a content range of the antioxidant is between 0.1 wt. % and 1.0 wt. %, and a content range of the slip agent is between 0.1 wt. % and 1.0 wt. %.

In terms of material types, the antioxidant is at least one selected from a group consisting of phenolic antioxidants, phosphorous acid antioxidants, and hindered phenolic antioxidants, and the slip agent is at least one selected from a group consisting of silicon dioxide, stearic acid, polyethylene wax, stearates, fatty acid esters, and composite slip agents, but the present disclosure is not limited thereto. In terms of use, the antioxidant is used to improve an oxidation resistance of the polyester material 100, and the slip agent is used to reduce a friction coefficient or a degree of adhesion on a surface of the polyester material 100.

In terms of antibacterial and antifungal properties, the antibacterial and antifungal additive has an antibacterial ability against following types of bacteria, including: *Escherichia coli*, *Staphylococcus aureus*, *Pneumoniae bacillus*, *Salmonella*, *Pseudomonas aeruginosa*, and methicillin-resistant *Staphylococcus aureus*.

In addition, the antibacterial and antifungal additive has an antifungal ability against following types of fungus, including: *Aspergillus niger*, *Penicillium tetrapine*, *Chaetomium globosum*, *Gliocladium virens*, and *Aureobasidium pullulans*.

In terms of experimental data, the antibacterial and antifungal polyester material 100 has a thickness ranging from 0.125 centimeters (cm) to 0.50 centimeters after being stretched. The antibacterial and antifungal polyester material 100 has a visible light transmittance of not less than 90% and a haze of not greater than 3%. In terms of antibacterial detection, the antibacterial and antifungal polyester material 100 passes the SGS standard with respect to the six types of bacteria (i.e., *Escherichia coli*, *Staphylococcus aureus*, *Pneumoniae bacillus*, *Salmonella*, *Pseudomonas aeruginosa*, and drug-resistant *Staphylococcus aureus*). Antibacterial activity values R for these six types of bacteria are all greater than 2, which indicate an excellent antibacterial effect. In terms of antifungal detection, the antibacterial and antifungal polyester material 100 passes the SGS standard with a rating of 0 (no fungal growth) with respect to the five types of fungi (i.e., *Aspergillus niger*, *Penicillium tetrapine*, *Chaetomium globosum*, *Gliocladium virens*, and *Aureobasidium pullulans*). This indicates an excellent antifungal effect.

Second Embodiment

Figure 4:
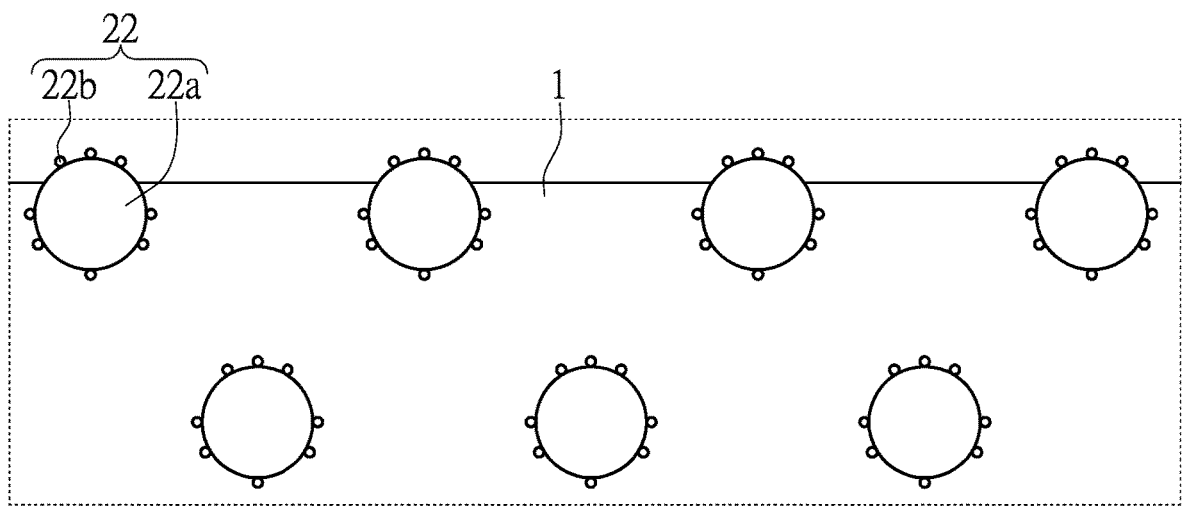
FIG. 4 is a schematic sectional view of an antibacterial and antifungal polyester material according to a second embodiment of the present disclosure.

Referring to FIG. 4, a second embodiment of the present disclosure provides an antibacterial and antifungal polyester material. The antibacterial and antifungal polyester material of the present embodiment is substantially the same as that of the above-mentioned first embodiment. The difference is that, in the antibacterial and antifungal polyester material of the present embodiment, the antibacterial and antifungal additive 22 is directly dispersed in the polyester resin substrate material 1. In other words, the antibacterial and antifungal additive 22 is directly dispersed in the polyester resin substrate material, instead of being dispersed in the polyester resin substrate material through the functional polyester master-batches.

More specifically, the antibacterial and antifungal polyester material of the present embodiment includes the polyester resin substrate material 1 and the antibacterial and antifungal additive 22. The antibacterial and antifungal additive includes a plurality of glass beads 22a, the plurality of glass beads 22a are dispersed in the polyester resin substrate material 1, and a plurality of silver nanoparticles 22b are distributed on an outer surface of each of the glass beads 22a, so as to enable the polyester material to have antibacterial and antifungal properties.

Beneficial Effects of the Embodiments

In conclusion, in the antibacterial and antifungal polyester material provided by the present disclosure, by virtue of introducing the antibacterial and antifungal additive into the polyester material and the antibacterial and antifungal additive including a plurality of glass beads, the plurality of glass beads being dispersed in the polyester material, and a plurality of silver nanoparticles being distributed on an outer surface of each of the glass bead, the polyester material can have good antibacterial and antifungal ability, and at the same time maintains high transparency and low haze. The antibacterial and antifungal polyester material can still maintain a certain antibacterial and antifungal effect after being used for a period of time. Furthermore, the antibacterial and antifungal polyester material has good application prospects, for example, the antibacterial and antifungal polyester material can be applied to food packaging materials or medical and sanitary equipment with antibacterial and antifungal requirements.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antibacterial and antifungal polyester material, comprising:
   a substrate film comprising a polyester resin material; and
   a plurality of functional polyester masterbatch granules comprising a polyester resin matrix material, dispersed in the substrate film
   wherein each of the functional polyester masterbatch granules includes
      an antibacterial and antifungal additive that includes
         a plurality of glass beads disposed in the polyester resin matrix material, and
         a plurality of silver nanoparticles distributed on an outer surface of the glass beads,
            wherein the plurality of silver nanoparticles do not agglomerate with each other;
   wherein film substrate has a thickness of between 0.125 centimeters (cm) and 0.50 centimeters, and each of the glass beads has a particle size of between 3 micrometers and 10 micrometers;
   wherein, based on a total weight of the antibacterial and antifungal polyester material being 100 wt. %, a content range of the polyester resin material of the substrate film is between 80 wt. % and 98 wt. %, and a content range of the functional polyester master-batch granules is between 2 wt. % and 20 wt. %;
   wherein, in each of the functional polyester master-batch granule, a weight ratio range of the polyester resin matrix material relative to the antibacterial and antifungal additive is ranging from 70 to 99: 1 to 30;
   wherein a content range of the plurality of silver nanoparticles in the antibacterial and antifungal polyester material is between 0.1 wt. % and 5.0 wt. %.

2. The antibacterial and antifungal polyester material according to claim 1, wherein, in each of the glass beads, the plurality of silver nanoparticles are distributed on the outer surface of each of the glass beads by means of physical adsorption.

3. The antibacterial and antifungal polyester material according to claim 1, wherein the antibacterial and antifungal polyester material is capable of being formed into the stretched polyester material through an injection molding process, an extrusion molding process, a vacuum molding process, or a blister molding process.

4. The antibacterial and antifungal polyester material according to claim 1, wherein at least parts of the plurality of glass beads in the polyester material are distributed on a surface layer of the polyester material, so as to expose at least parts of the plurality of silver nanoparticles to an external environment and to enable the polyester material to have the antibacterial and antifungal properties.

5. The antibacterial and antifungal polyester material according to claim 1, wherein the polyester resin material is polyethylene terephthalate, and in each of the functional polyester master-batches, the polyester resin matrix material is polyethylene terephthalate; wherein the polyester resin material has a first refractive index, the polyester resin matrix material has a second refractive index, and each of the glass beads has a third refractive index; wherein the first refractive index is between 1.55 and 1.60, the second refractive index is between 95% and 105% of the first refractive index, and the third refractive index is between 95% and 105% of the first refractive index.

6. The antibacterial and antifungal polyester material according to claim 5, wherein the antibacterial and antifungal polyester material has a visible light transmittance of not less than 80% and a haze of not greater than 5%.

7. The antibacterial and antifungal polyester material according to claim 5, wherein the polyester resin matrix material in each of the functional polyester master-batches is polyethylene terephthalate with low crystallinity, and a crystallinity of the polyester resin matrix material is between 5% and 15%.

8. The antibacterial and antifungal polyester material according to claim 1, wherein a matrix material of each of the glass beads is soluble glass powders, a density of each of the glass beads is between 2 g/cm$^3$ and 3 g/cm$^3$, and a heat-resistant temperature of each of the glass beads is not less than 500° C.

9. The antibacterial and antifungal polyester material according to claim 1, further comprising: an antioxidant and a slip agent dispersed in the polyester resin material, wherein, based on a total weight of the antibacterial and antifungal polyester material being 100 wt. %, a content range of the antioxidant is between 0.1 wt. % and 1.0 wt. %, and a content range of the slip agent is between 0.1 wt. % and 1.0 wt. %.

10. The antibacterial and antifungal polyester material according to claim 1, wherein the antibacterial and antifungal additive has an antibacterial property against following types of bacteria, which include: *Escherichia coli, Staphylococcus aureus, Pneumoniae bacillus, Salmonella, Pseudomonas aeruginosa*, and methicillin-resistant *Staphylococcus aureus*; wherein the antibacterial and antifungal additive has an antifungal property against following types of fungi, which include: *Aspergillus niger, Penicillium tetrapine, Chaetomium globosum, Gliocladium virens*, and *Aureobasidium pullulans*.

* * * * *